United States Patent
Kasemi et al.

(10) Patent No.: US 9,631,047 B2
(45) Date of Patent: *Apr. 25, 2017

(54) CURING AGENTS FOR LOW-EMISSION EPOXY RESIN PRODUCTS

(71) Applicant: SIKA TECHNOLOGY AG, Baar (CH)

(72) Inventors: Edis Kasemi, Zurich (CH); Andreas Kramer, Zurich (CH); Ursula Stadelmann, Zurich (CH); Urs Burckhardt, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/759,538

(22) PCT Filed: Dec. 20, 2013

(86) PCT No.: PCT/EP2013/077703
§ 371 (c)(1),
(2) Date: Jul. 7, 2015

(87) PCT Pub. No.: WO2014/108305
PCT Pub. Date: Jul. 17, 2014

(65) Prior Publication Data
US 2015/0337076 A1 Nov. 26, 2015

(30) Foreign Application Priority Data

Jan. 8, 2013 (EP) .................... 13150545

(51) Int. Cl.
| | | |
|---|---|---|
| *C09K 3/00* | (2006.01) | |
| *C08L 63/00* | (2006.01) | |
| *C08G 59/18* | (2006.01) | |
| *C08G 59/22* | (2006.01) | |
| *C08G 59/56* | (2006.01) | |
| *C09D 163/00* | (2006.01) | |

(52) U.S. Cl.
CPC ......... *C08G 59/184* (2013.01); *C08G 59/223* (2013.01); *C08G 59/56* (2013.01); *C09D 163/00* (2013.01); *C08G 2650/50* (2013.01)

(58) Field of Classification Search
CPC .... C08G 59/56; C08G 59/184; C08G 59/223; C08G 2650/50; C09D 163/00
USPC ......... 528/103; 252/182.23, 182.13; 525/523
See application file for complete search history.

(56) References Cited

U.S. PATENT DOCUMENTS

| | | | |
|---|---|---|---|
| 4,751,278 A | | 6/1988 | Brytus |
| 5,739,209 A | * | 4/1998 | Lassila ............... C08G 59/4042 525/113 |
| 7,683,154 B2 | | 3/2010 | Volle |
| 8,063,157 B2 | | 11/2011 | Volle et al. |
| 2004/0077802 A1 | | 4/2004 | Scherzer et al. |
| 2009/0005516 A1 | | 1/2009 | Volle |
| 2010/0048954 A1 | * | 2/2010 | Vedage ................. C07C 209/48 564/372 |

FOREIGN PATENT DOCUMENTS

| | | |
|---|---|---|
| EP | 1 385 896 A1 | 2/2004 |
| GB | 1 258 454 A | 12/1971 |
| JP | 62-177016 A | 8/1987 |
| WO | WO 99/28365 A1 | 6/1999 |
| WO | WO 02/074832 A1 | 9/2002 |
| WO | WO 2007/060091 A1 | 5/2007 |

OTHER PUBLICATIONS

International Search Report (PCT/ISA/210) mailed on Nov. 4, 2014, by the European Patent Office as the International Searching Authority for International Application No. PCT/EP2013/077703.
Written Opinion (PCT/ISA/237) mailed on Nov. 4, 2014, by the European Patent Office as the International Searching Authority for International Application No. PCT/EP2013/077703.
International Search Report (PCT/ISA/210) mailed on Nov. 4, 2014, by the European Patent Office as the International Searching Authority for International Application No, PCT/EP2013/077701.
Written Opinion (PCT/ISA/237) mailed on Nov. 4, 2014, by the European Patent Office as the International Searching Authority for International Application No. PCT/EP2013/077701.
Notification of Transmittal of Translation of the International Preliminary Report on Patentability (Forms PCT/IB/338 and PCT/IB/373) and the Written Opinion of the International Searching Authority (Form PCT/ISA/237) issued on Jul. 23, 2015, by the International Bureau of WIPO in corresponding International Application No. PCT/EP2013/077703. (7 pages).
Chinese Office Action issued Aug. 5, 2016 in corresponding Chinese Patent Application No. 201380067431.3 (with English translation).

* cited by examiner

*Primary Examiner* — David Karst

(74) *Attorney, Agent, or Firm* — Buchanan Ingersoll & Rooney PC

(57) ABSTRACT

The present invention relates to curing agents for epoxy resins, containing at least one adduct of a primary diamine and an aromatic monoepoxide, at least one primary diamine and at least one secondary diamine which is free of primary amino groups and free of hydroxyl groups. The curing agent is of low viscosity and cures, together with epoxy resins, rapidly and without blushing, even under damp, cold conditions, to form films of high hardness and low brittleness. It is particularly well suited for low-emission coatings that cure at room temperature.

14 Claims, No Drawings

CURING AGENTS FOR LOW-EMISSION EPOXY RESIN PRODUCTS

TECHNICAL FIELD

The invention relates to the field of curing agents for epoxy resins, epoxy resin products and the use thereof, in particular as coatings, films and paints and varnishes.

PRIOR ART

Mixtures that contain amines and are based on epoxy amine adducts are typically used as curing agents in room temperature curing epoxy resin products. In most cases, these mixtures are too highly viscous especially for coating applications unless diluents are used. Typical diluents used for this purpose include in particular benzyl alcohol, glycols or alkylphenols, which are relatively low-odor and are compatible with the epoxy resin. Such diluents will not react with epoxy resins at room temperature, and are not incorporated into the resin matrix during curing. Demand is increasing, however, for low-emission products that contain low levels of substances that can be released by evaporation or diffusion processes after curing. Thus non-incorporable diluents can be used in only very small quantities, if at all, in low-emission epoxy products.

Another possibility for obtaining low-viscosity curing agents based on epoxy amine adducts involves increasing the amine content by using an amine surplus to produce the adducts, or by diluting the adducts by adding amines in a post-processing step. However, when applied to planar surfaces, an increased concentration of primary amines, such as diethylenetriamine, isophoronediamine or xylylenediamine, for example, typically leads to curing defects ("blushing") such as hazing, spots, and rough or tacky surfaces, which are caused by the formation of salts as a result of the amines reacting with carbon dioxide ($CO_2$) from the air and which occur particularly in high humidity and/or at low temperatures. The use of secondary rather than primary amines in turn leads to slow curing, particularly at low temperatures, and in most cases to insufficient hardness.

U.S. Pat. No. 4,751,278 and WO 99/28365 disclose special adducts of diamines and monoepoxides as curing agents for epoxy resins that cure well at low temperatures. The adducts are used in combination with benzyl alcohol and optionally with a small primary diamine.

U.S. Pat. No. 8,063,157 and U.S. Pat. No. 7,683,154 disclose curing agents based on low-viscosity epoxy amine adducts, which can be processed without the addition of non-reactive diluents. The described adducts are costly to produce since a large surplus of the amine is used and then removed by distillation. Without distillation removal of the surplus amine, defective surfaces will develop during curing in cold conditions.

BRIEF SUMMARY OF THE INVENTION

The object of the present invention is therefore to provide a curing agent for low-emission epoxy resin products, which can be easily produced, is of low viscosity and can be readily processed together with epoxy resins, and which cures with said resins rapidly and without blushing, even in damp and cold conditions, in particular producing coatings of high hardness and strength.

Unexpectedly, it was found that this object is very effectively attained by the curing agent according to claim 1. The adduct contained in the curing agent according to claim 1 can be produced in a simple method without a distillation step. The viscosity of the curing agent is low enough that it can be readily worked with epoxy resins without the aid of diluents, even forming self-leveling epoxy resin coatings. It produces rapid curing without blushing, even in unfavorable conditions, for example at 8° C. and high humidity, and enables epoxy resin coatings of high hardness and low brittleness. The curing agent according to claim 1 is thus very well suited for coatings, in particular for floors. The curing agent according to claim 1 enables the production of low-emission epoxy resin products that meet the standards for environmental quality seals, for example according to Emicode (EC1 Plus), AgBB, DIBt, Der Blaue Engel, AFSSET, RTS (M1) and US Green Building Council (LEED), while at the same time satisfying the high demand for quality in terms of workability and use.

Further aspects of the invention are the subject matter of additional independent claims. Particularly preferred embodiments of the invention are the subject matter of the dependent claims.

DETAILED DESCRIPTION OF THE INVENTION

The invention concerns a curing agent suitable for curing epoxy resins, and containing
- at least one adduct of at least one primary diamine P1 and at least one aromatic monoepoxide,
- at least one primary diamine P2, and
- at least one secondary diamine, which is free of primary amino groups and free of hydroxyl groups, and which is not 1,3-bis(benzylaminomethyl)benzene.

Substance names that begin with "poly", such as polyamine, polyol or polyepoxy, denote substances which, according to the formula, contain two or more of the functional groups occurring in their name per molecule.

A "primary diamine" is an amine which has two primary amino groups and is free of secondary amino groups.

A "secondary diamine" is an amine which has two secondary amino groups and is free of primary amino groups.

A "primary amino group" denotes an $NH_2$ group which is bound to an organic residue, and a "secondary amino group" denotes an NH group which is bound to two organic residues which together may also be part of a ring.

"Amine hydrogen" denotes the hydrogen atoms of primary and secondary amino groups.

The "amine hydrogen equivalent weight" is the percentage by weight of a curing agent or an amine per amine hydrogen occurring in the curing agent or the amine. A "non-incorporable diluent" is a substance which is soluble in an epoxy resin and reduces the viscosity thereof, but is not covalently incorporated into the resin matrix during curing of the epoxy resin.

In the present document, the term "viscosity" refers to dynamic viscosity or shear viscosity, which is defined by the ratio of shear stress to shear rate (velocity gradient), and is determined as described in the embodiment examples.

The described curing agent contains at least one adduct of at least one primary diamine P1 and at least one aromatic monoepoxide.

This adduct is of substantially lower viscosity than adducts of aromatic diepoxides.

It exhibits significantly better compatibility with customary epoxy resins that are based on bisphenol A or bisphenol F as compared with adducts of aliphatic monoepoxides.

The curing agent causes substantially less blushing than adducts of amines having more than two amino groups, in particular polyalkylene amines such as DETA or TETA, even if the adduct has been obtained without a distillation step.

The adduct is produced by mixing the monoepoxide with the diamine, and reacting the epoxy groups of the monoepoxide with amino groups of the primary diamine using customary methods, in particular at a temperature ranging from 40 to 120° C., preferably 40 to 80° C. In this reaction, the quantities of the diamine and the monoepoxide used are advantageously such that the adduct contains at least one, preferably at least two amine hydrogens.

The adduct is preferably produced by reacting a surplus of primary diamine P1 with the monoepoxide and then removing the surplus primary diamine P1 by distillation. The adduct is particularly preferably produced without a distillation step, specifically without the removal by distillation of unreacted primary diamine P1. This production process is particularly simple and requires no costly distillation apparatus.

The adduct can preferably be obtained by reacting primary diamine P1 with the monoepoxide in a molar ratio ranging from 1/0.8 to 1/1.5, in particular 1/0.9 to 1/1.2. An adduct thus obtained can be used immediately after production without further processing, in particular without removal by distillation of the unreacted primary diamine P1, as a constituent in the described curing agent.

Such an adduct contains monoadducts of formula (I) as its main constituent and diadducts of formula (II) and unreacted primary diamine P1 as secondary constituents. The term "adduct" in this case includes all of these constituents.

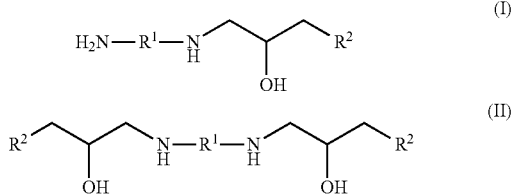

In formulas (I) and (II), $R^1$ is the difunctional residue of primary diamine P1 after removal of its two primary amino groups and $R^2$ is the residue of the aromatic monoepoxide after removal of its epoxy group.

The aromatic monoepoxide is preferably the glycidyl ether of a phenol, in particular the glycidyl ether of phenol, cresol, tert-butylphenol or cardanol.

The adduct is particularly preferably obtained from a cresyl glycidyl ether. Suitable cresyl glycidyl ethers include all isomeric cresyl glycidyl ethers and mixtures thereof, especially commercially available types, in particular Araldite® DY-K (Huntsman), Polypox™ R6 (Dow), Heloxy™ KR (Hexion) or Erisys® GE-10 (CVC Spec. Chem.). Ortho-cresyl glycidyl ether is particularly preferred.

An adduct of this type is very highly compatible with customary epoxy resin products, and enables cured films of high gloss and high hardness.

Suitable primary diamines P1 are
 aliphatic, cycloaliphatic or arylaliphatic primary diamines, in particular 2,2-dimethyl-1,3-propanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-undecanediamine, 1,12-dodecanediamine, 1,2-, 1,3- and 1,4-diaminocyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 1-amino-3-aminomethyl-3,5,5-trimethylcyclohexane (=isophoronediamine or IPD), 2- and 4-methyl-1,3-diaminocyclohexane and mixtures thereof, 1,3- and 1,4-bis(aminomethyl)cyclohexane, 2,5(2,6)-bis(aminomethyl)bicyclo[2.2.1]heptane (NBDA), 3(4), 8(9)-bis(aminomethyl)tricyclo[5.2.1.0$^{2,6}$]decane, 1,4-diamino-2,2,6-trimethylcyclohexane (TMCDA), 1,8-menthanediamine, 3,9-bis(3-aminopropyl)-2,4,8,10-tetraoxaspiro[5.5]undecane and 1,3- and 1,4-bis(aminomethyl)benzene;

polyamines having tertiary amino groups and two primary aliphatic amino groups, in particular N,N'-bis(aminopropyl)-piperazine, N,N-bis(3-aminopropyl)methylamine, N,N-bis(3-aminopropyl)ethylamine, N,N-bis(3-aminopropyl)propylamine, N,N-bis(3-aminopropyl)cyclohexylamine, N,N-bis(3-aminopropyl)-2-ethylhexylamine, and the products of double-cyanoethylation and subsequent reduction of fatty amines, which are derived from natural fatty acids, such as N,N-bis(3-aminopropyl)dodecylamine and N,N-bis(3-aminopropyl)tallow alkylamine, available as Triameen® Y12D and Triameen® YT (Akzo Nobel);

ether group-containing aliphatic diamines, in particular bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine and higher oligomers of these diamines, bis(3-aminopropyl)polytetrahydrofurans and other polytetrahydrofurandiamines, cycloaliphatic ether group-containing diamines obtained from the propoxylation and subsequent amination of 1,4-dimethylolcyclohexane, available particularly as Jeffamine® RFD-270 (Huntsman), and polyoxyalkylene diamines, which are typically products obtained from the amination of polyoxyalkylene diols and are available, for example, under the name Jeffamine® (Huntsman), under the name Polyetheramine (BASF) or under the name PC Amine® (Nitroil). Particularly suitable polyoxyalkylene diamines are Jeffamine® D-230, Jeffamine® D-400, Jeffamine® D-2000, Jeffamine® EDR-104, Jeffamine® EDR-148 and Jeffamine® EDR-176, and corresponding amines from BASF or Nitroil.

Preferred primary diamines P1 are those that have a molecular weight of 100 to 200 g/mol, in particular primary diamines P1 selected from the group consisting of 1,6-hexanediamine, 1,5-diamino-2-methylpentane, 2,2,4- and 2,4,4-trimethylhexamethylenediamine, isophoronediamine, 1,3-bis(aminomethyl)cyclohexane, 1,4-bis(aminomethyl)cyclohexane, 2- and 4-methyl-1,3-diaminocyclohexane and mixtures thereof, and 1,3-bis(aminomethyl)benzene. The adducts of these diamines are highly compatible in epoxy resin products.

Of these, 1,5-diamino-2-methylpentane and 2,2,4- and 2,4,4-trimethylhexamethylenediamine are particularly preferred. These diamines are asymmetrical and have two differently reactive amino groups. The adducts of these diamines are of particularly low viscosity and have a particularly low concentration of unreacted primary diamine P1, even if they are produced without a distillation step. 1,5-Diamino-2-methylpentane is most preferable. The adducts thereof are of particularly low viscosity and also cost-efficient.

Further preferred primary diamines P1 are selected from the group consisting of 2,2-dimethyl-1,3-propanediamine, 1,3-pentanediamine (DAMP), 1,5-pentanediamine, 1,5-diamino-2-methylpentane (MPMD) and 1,6-hexanediamine. These primary diamines P1 are particularly well suited for the production of adducts in which an amine surplus is used for production, and after adducting, is removed by distillation. Of these, the diamines 1,3-pentanediamine (DAMP) and 1,5-diamino-2-methylpentane (MPMD), which are asymmetrical with respect to the amino groups, are particularly preferred.

A particularly preferred adduct can be obtained by reacting 1,5-diamino-2-methylpentane with a cresyl glycidyl ether in a molar ratio of 1/0.9 to 1/1.2. This adduct is of particularly low viscosity and is made from cost-efficient educts.

Adducting in this molar ratio produces an adduct that is a mixture of predominantly a monoadduct of formula (I) and small fractions of diadduct of formula (II) and unreacted 1,5-diamino-2-methylpentane.

Adducting in a molar ratio of approximately 1/1 results in a very low-viscosity adduct. Adducting in a molar ratio of approximately 1/1.1 or 1/1.2 results in a somewhat higher viscosity adduct with a particularly low concentration of free 1,5-diamino-2-methylpentane, which, due to the volatility of the latter substance, is advantageous to those working with the adduct.

The described curing agent further contains at least one primary diamine P2.

Suitable primary diamines P2 are the same as the primary diamines already listed as suitable primary diamines P1.

Preferably, primary diamine P2 is not identical to the primary diamine P1 which is used for adducting.

Preferred primary diamines P2 have a molecular weight of 140 to 300 g/mol. They are selected in particular from the group consisting of isophoronediamine, 2,2,4- and 2,4,4-trimethylhexamethylenediamine, 1,3-bis(aminomethyl)cyclohexane, 1,4-bis(aminomethyl)cyclohexane, bis(4-aminocyclohexyl)methane, bis(4-amino-3-methylcyclohexyl)methane, 4,7-dioxadecane-1,10-diamine, polyoxypropylenediamines and cycloaliphatic ether group-containing diamines obtained from the propoxylation and subsequent amination of 1,4-dimethylolcyclohexane. When these diamines P2 are used, particularly low-viscosity curing agents for epoxy resins are obtained, which are highly compatible in epoxy resin products and enable rapid curing with practically no tendency toward blushing.

Of these, the polyoxypropylenediamines, in particular Jeffamine® D-230 (Huntsman) and corresponding diamines from BASF or Nitroil, and the cycloaliphatic ether group-containing diamines obtained from the propoxylation and subsequent amination of 1,4-dimethylolcyclohexane, in particular Jeffamine® RFD-270 (Huntsman), are particularly preferred.

These primary diamines are particularly nonvolatile and are therefore less burdensome to those working with them.

The described curing agent further contains at least one secondary diamine, which is free of primary amino groups and free of hydroxyl groups, and which is not 1,3-bis(benzylaminomethyl)benzene.

It has a satisfactory thinning effect on the adduct and has no tendency toward blushing.

Preferred secondary diamines are N,N'-dialkylation products of primary diamines, in which the primary diamine preferably has a molecular weight of 28 to 300 g/mol.

Particularly preferred secondary diamines are N,N'-dialkylation products of primary diamines P3, in which primary diamine P3 is selected from the group consisting of 1,6-hexanediamine, 1,5-diamino-2-methylpentane, 1,3-bis(aminomethyl)cyclohexane, 1,4-bis(aminomethyl)cyclohexane and 1,3-bis(aminomethyl)benzene.

These secondary diamines are of low viscosity and are readily compatible in epoxy resin compositions.

N,N'-dialkylation products of 1,3-bis(aminomethyl)benzene are most preferred as the secondary diamine. Curing agents that contain these secondary diamines enable epoxy resin coatings which cure rapidly to produce particularly attractive, non-tacky films, including in cold conditions.

Preferred are the alkyl groups in the N,N'-dialkylation products selected from the group consisting of 2-phenylethyl, benzyl, isobutyl, hexyl or 2-ethylhexyl.

These secondary diamines enable particularly low-viscosity curing agents, which enable epoxy resin compositions of high hardness and low brittleness that can be readily processed.

One particularly preferred secondary diamine is 1,3-bis(2-ethylhexylaminomethyl)benzene. It can be obtained, in particular, from the reductive alkylation of 1,3-bis(aminomethyl)benzene and 2-ethylhexanal.

This secondary diamine can be produced in a highly pure form by a simple process. It enables curing agents of surprisingly low viscosity, which cure rapidly and have practically no tendency toward blushing. Epoxy resin coatings that can be obtained with this curing agent cure rapidly, including in cold conditions, and have a low tendency toward yellowing and very low brittleness.

A further particularly preferred secondary diamine is 1,3-bis(2-phenylethylaminomethyl)benzene. It is commercially available as a constituent of Gaskamine® 240 (Mitsubishi Gas Chemical). This secondary diamine enables curing agents that cure rapidly and have a low tendency toward blushing.

A particularly preferred curing agent contains
at least one adduct of 1,5-diamino-2-methylpentane and cresyl glycidyl ether,
at least one primary diamine P2, and
at least one N,N'-dialkylation product of 1,3-bis(aminomethyl)benzene which is not 1,3-bis(benzylaminomethyl)benzene, in particular selected from the group consisting of 1,3-bis(2-ethylhexylaminomethyl)benzene and 1,3-bis(2-phenylethylaminomethyl)benzene.

This curing agent is of particularly low viscosity and is very highly compatible with epoxy resins based on bisphenol A or bisphenol F.

In the described curing agent, the ratios of adduct, primary diamine P2 and secondary diamine are preferably such that, of the total number of their amine hydrogens that are reactive to epoxy groups
15 to 75% are from the adduct,
15 to 60% are from the primary diamine P2, and
10 to 40% are from the secondary diamine.

A curing agent of this type has particularly low viscosity and cures rapidly and largely without blushing to form cured films of high gloss and high hardness.

In the described curing agent, the ratios of adduct, primary diamine P2 and secondary diamine are particularly such that, of the total number of their amine hydrogens that are reactive to epoxy groups, 15 to 60% are from the adduct,
25 to 50% are from primary diamine P2, and
10 to 35%, in particular 10 to 20%, are from the secondary diamine.

This curing agent has particularly low viscosity and cures rapidly and largely without blushing to form cured films of high gloss, high hardness and particularly low brittleness.

In one embodiment, the described curing agent further contains at least one diamine which is free of hydroxyl groups and has one primary and one secondary amino group, in particular N-butyl-1,2-ethanediamine, N-hexyl-1,2-ethanediamine, N-(2-ethylhexyl)-1,2-ethanediamine, N-cyclohexyl-1,2-ethanediamine, 4-aminomethyl piperidine, N-(2-aminoethyl)piperazine, N-methyl-1,3-propanediamine, N-butyl-1,3-propanediamine, N-(2-ethylhexyl)-1,3-propanediamine, N-cyclohexyl-1,3-propanediamine, 3-methylamino-1-pentylamine, 3-ethylamino-1-pentylamine, 3-cyclohexylamino-1-pentylamine, fatty diamines such as N-cocoalkyl-1,3-propanediamine and products of the Michael addition reaction of primary aliphatic diamines with acrylonitrile, maleic or fumaric acid diesters, citraconic acid diesters, acrylic and methacrylic acid esters, acrylic and methacrylic acid amides and itaconic acid diesters, reacted in a 1:1 molar ratio, and products of the partially reductive alkylation of primary diamines with aldehydes or ketones, and partially styrolized polyamines, in particular Gaskamine® 240 (Mitsubishi Gas Chemical).

One preferred hydroxyl group-free diamine which has one primary and one secondary amino group is an N-monoalkylated primary diamine P3, which is formed particularly in the alkylation of a diamine P3 with a hypostoichiometric quantity of the alkylating agent in relation to the primary amino groups of primary diamine P3.

One particularly preferred hydroxyl group-free diamine which has one primary and one secondary amino group is N-2-ethylhexyl-1,3-bis(aminomethyl)-benzene, which is present particularly together with 1,3-bis(2-ethylhexylaminomethyl)benzene. This diamine enables low viscosity curing agents, which cure with epoxy resins very rapidly and with only a slight tendency toward blushing to form films of high gloss, high hardness and a low tendency toward yellowing.

A further particularly preferred hydroxyl group-free diamine which has one primary and one secondary amino group is N-2-phenylethyl-1,3-bis(aminomethyl)benzene, which is commercially available as a constituent of Gaskamine® 240 (Mitsubishi Gas Chemical). This diamine enables low viscosity curing agents, which cure with epoxy resins very rapidly and with only a slight tendency toward blushing to form films with high gloss and high hardness.

In such a curing agent, the ratios of adduct, primary diamine P2, secondary diamine and hydroxyl group-free diamine which has one primary and one secondary amino group are preferably such that, of the total number of their amine hydrogens that are reactive to epoxy groups
10 to 50% are from the adduct,
15 to 45% are from primary diamine P2, and
20 to 60%, in particular 20 to 30%, are from the total of the secondary diamine and the hydroxyl group-free diamine which has one primary and one secondary amino group.

A curing agent of this type has low viscosity and cures together with epoxy resins very rapidly and with only a slight tendency toward blushing to form cured films with high gloss and high hardness.

The curing agent can further contain triamines, in particular tris(2-aminoethyl)amine, tris(2-aminopropyl)amine or tris(3-aminopropyl)amine, and particularly polyoxyalkylene triamine, such as particularly Jeffamine® T-403, Jeffamine® T-3000, Jeffamine®T-5000 or corresponding amines from BASF or Nitroil.

The curing agent can further contain polyamines which have secondary amino groups and two primary aliphatic amino groups, for example 3-(2-aminoethyl)aminopropylamine, bis(hexamethylene)triamine (BHMT), diethylenetriamine (DETA), triethylenetetramine (TETA), tetraethylenepentamine (TEPA), pentaethylenehexamine (PEHA) and higher homologs of linear polyethylene amines such as polyethylenepolyamine with 5 to 7 ethyleneamine units (so-called "higher ethylenepolyamine", HEPA), products from the repeated cyanoethylation or cyanobutylation and subsequent hydrogenation of primary diamines and polyamines which have at least two primary amino groups, such as dipropylenetriamine (DPTA), N-(2-aminoethyl)-1,3-propanediamine (N3-amine), N,N'-bis(3-aminopropyl)ethylenediamine (N4-amine), N,N'-bis(3-aminopropyl)-1,4-di-aminobutane, N5-(3-aminopropyl)-2-methyl-1,5-pentanediamine, N3-(3-amino-pentyl)-1,3-pentanediamine, N5-(3-amino-1-ethylpropyl)-2-methyl-1,5-pentanediamine and N,N'-bis(3-amino-1-ethylpropyl)-2-methyl-1,5-pentanediamine. The curing agent can further contain aromatic polyamines, in particular m- and p-phenylenediamine, 4,4'-, 2,4' and 2,2'-diaminodiphenylmethane, 3,3'-dichloro-4,4'-diaminodiphenylmethane (MOCA), 2,4- and 2,6-toluylenediamine, mixtures of 3,5-dimethylthio-2,4- and -2,6-toluylenediamine (available as Ethacure® 300 from Albermarle), mixtures of 3,5-diethyl-2,4- and -2,6-toluylenediamine (DETDA), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 4,4'-diaminodiphenylsulfone (DDS), 4-amino-N-(4-aminophenyl)benzenesulfonamide, 5,5'-methylenedianthranilic acid, dimethyl-(5,5'-methylenedianthranilate), 1,3-propylene-bis(4-aminobenzoate), 1,4-butylene-bis(4-aminobenzoate), polytetramethylene oxide-bis(4-aminobenzoate) (available as Versalink® from Air Products), 1,2-bis(2-aminophenylthio)ethane, 2-methylpropyl-(4-chloro-3,5-diaminobenzoate) and tert-butyl-(4-chloro-3,5-diaminobenzoate).

The curing agent can further contain additional adducts, in particular adducts of the stated polyamines with diepoxides in a molar ratio of approximately 2/1, adducts with monoepoxides in a molar ratio of at least 1/1, and reaction products of amines and epichlorohydrin, in particular of 1,3-bis(aminomethyl)benzene, commercially available as Gaskamine® 328 (Mitsubishi Gas Chemical).

The curing agent can further contain polyamidoamines, which are reaction products of a monovalent or polyvalent carboxylic acid, or the esters or anhydrides thereof, in particular a dimeric fatty acid and an aliphatic, cycloaliphatic or aromatic polyamine used in a stoichiometric surplus, in particular a polyalkylene amine such as DETA or TETA, in particular the commercially available polyamidoamines Versamid® 100, 125, 140 and 150 (Cognis), Aradur® 223, 250 and 848 (Huntsman), Euretek® 3607 and 530 (Huntsman) and Beckopox® EH 651, EH 654, EH 655, EH 661 and EH 663 (Cytec).

The curing agent can further contain phenalkamines, also called Mannich bases, which are reaction products of a Mannich reaction of phenols, in particular cardanol, with aldehydes, in particular formaldehyde, and polyamines, in particular the commercially available phenalkamines Cardolite® NC-541, NC-557, NC-558, NC-566, Lite 2001 and Lite 2002 (Cardolite), Aradur® 3440, 3441, 3442 and 3460

(Huntsman) and Beckopox® EH 614, EH 621, EH 624, EH 628 and EH 629 (Cytec). The curing agent can further contain monoamines such as hexylamine and benzylamine.

The curing agent can further contain mercapto group-containing compounds, in particular the following:
- liquid mercaptan-terminated polysulfide polymers, known under the brand name Thiokol® (Morton Thiokol; available from SPI Supplies or from Toray Fine Chemicals, for example), particularly the types LP-3, LP-33, LP-980, LP-23, LP-55, LP-56, LP-12, LP-31, LP-32 and LP-2; and also known under the brand names Thioplast® (Akzo Nobel), particularly the types G 10, G 112, G 131, G 1, G 12, G 21, G 22, G 44 and G 4;
- mercaptan-terminated polyoxyalkylene ether, which can be obtained, for example, by reacting polyoxyalkylene-diols and -triols either with epichlorohydrin or with an alkylene oxide, followed by sodium hydrogensulfide;
- mercaptan-terminated compounds in the form of polyoxyalkylene derivatives, known under the brand name Capcure® (Cognis), in particular types WR-8, LOF and 3-800;
- polyesters of thiocarboxylic acids, for example pentaerythritol tetramercaptoace-tate, trimethylolpropane trimercaptoacetate, glycol dimercaptoacetate, pentaerythritol tetra(3-mercaptopropionate), trimethylol propanetri-(3-mercaptopropionate) and glycol di-(3-mercaptopropionate), and the esterification products of polyoxyalkylenediols and -triols, ethoxylated trimethylolpropane and polyester diols with thiocarboxylic acids such as thioglycolic acid and 2- or 3-mercaptopropionic acid; and
- additional mercapto group-containing compounds, for example 2,4,6-trimercapto-1,3,5-triazine, 2,2'-(ethylenedioxy)-diethanethiol (triethylene glycol-dimercaptan) and ethanedithiol.

The curing agent can further contain at least one accelerator. Suitable accelerators are substances which accelerate the reaction between amino groups and epoxy groups, in particular acids or compounds that can be hydrolyzed to acids, in particular organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic acid esters, other organic or inorganic acids such as, in particular, phosphoric acid, or mixtures of the aforementioned acids and acid esters; and further, tertiary amines such as, in particular, 1,4-diazabicyclo[2.2.2]octane, benzyldimethylamine, □-methylbenzyldimethylamine, triethanolamine, dimethylaminopropylamine, imidazoles, in particular N-methylimidazole, N-vinylimidazole or 1,2-dimethylimidazole, salts of such tertiary amines, quaternary ammonium salts, such as, in particular, benzyltrimethylammonium chloride, amidines, in particular 1,8-diazabicyclo[5.4.0]undec-7-ene, guanidines, in particular 1,1,3,3-tetramethylguanidine, phenols, in particular bisphenols, phenol resins and Mannich bases, in particular 2-(dimethylaminomethyl)phenol, 2,4,6-tris(dimethylaminomethyl)phenol and polymers of phenol, formaldehyde and N,N-dimethyl-1,3-propanediamine, phosphites, in particular diphenylphosphites and triphenylphosphites, and compounds that contain mercapto groups.

Preferred accelerators are salicylic acid and/or 2,4,6-tris(dimethylaminomethyl)phenol.

The curing agent can further contain at least one non-incorporable diluent, in particular xylene, 2-methoxyethanol, dimethoxyethanol, 2-ethoxyethanol, 2-propoxyethanol, 2-isopropoxyethanol, 2-butoxyethanol, 2-phenoxyethanol, 2-benzyloxyethanol, benzyl alcohol, ethylene glycol, ethylene glycol dimethylether, ethylene glycol diethylether, ethylene glycol dibutylether, ethylene glycol diphenylether, diethylene glycol, diethylene glycol monomethyl ether, diethylene-glycol monoethyl ether, diethylene glycol mono-n-butyl ether, diethylene glycol dimethylether, diethylene glycol diethylether, diethylene glycol di-n-butylyl ether, propylene glycol butyl ether, propylene glycol phenyl ether, dipropylene glycol, dipropylene glycol monomethyl ether, dipropylene glycol dimethyl ether, dipropylene glycol di-n-butylether, N-methylpyrrolidone, diphenylmethane, diisopropyl naphthalin, petroleum fractions, for example Solvesso® types (Exxon), alkylphenols such as tert-butylphenol, nonylphenol, dodecylphenol and 8,11,14-pentadecatrienylphenol (cardanol, from cashew nutshell liquid, available, for example, as Cardolite NC-700 from Cardolite Corp., USA), styrolized phenol, bisphenols, aromatic hydrocarbon resins, in particular phenol group-containing types, alkoxylated phenol, in particular ethoxylated or propoxylated phenol, in particular 2-phenoxyethanol, adipates, sebacates, phthalates, benzoates, organic phosphoric and sulfonic acid esters and sulfonamides. Preferred are benzyl alcohol, dodecyl phenol, tert-butylphenol, styrolized phenol, ethoxylated phenol and phenol group-containing aromatic hydrocarbon resins, in particular the Novares® types LS 500, LX 200, LA 300 and LA 700 (Rütgers).

The curing agent preferably contains no diluents or only a small concentration of non-incorporable diluents, particularly preferably less than 25 wt %, in particular less than 10 wt %, and most preferably less than 5 wt %. In particular, no non-incorporable diluents are added to the curing agent.

A further subject matter of the invention is an epoxy resin composition that contains at least one epoxy resin and the curing agent described above.

Suitable epoxy resins are customary industrial epoxy resins. These are obtained through known processes, for example by oxidizing the corresponding olefins or by reacting epichlorohydrin with the corresponding polyols, polyphenols or amines. Particularly suitable epoxy resins are so-called polyepoxy liquid resins, hereinafter referred to as "liquid resin". These have a glass transition temperature of less than 25° C.

Also suitable as the epoxy resin are so-called solid resins, which have a glass transition temperature of greater than 25° C. and can be ground to loose powders at 25° C.

Suitable epoxy resins are particularly aromatic epoxy resins, in particular the glycidylation products of:
- bisphenol A, bisphenol F or bisphenol A/F, in which A stands for acetone and F stands for formaldehyde, which were used as educts in preparing said bisphenols. In the case of bisphenol F, positional isomers may also be provided, in particular derived from 2,4'- and 2,2'-hydroxyphenylmethane;
- dihydroxybenzene derivatives, such as resorcinol, hydroquinione and pyrocatechol;
- other bisphenols or polyphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4-bis(4-hydroxyphenyl)hexane, 4,4-bis(4-hydroxyphenyl)heptane, 2,4-bis(4-hydroxyphenyl)-2-methylbutane, 2,4-bis(3,5-dimethyl-4-hydroxyphenyl)-2- methylbutane, 1,1-bis(4-hydroxyphenyl)cyclohexane (bisphenol Z), 1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'-dihydroxydiphenyl (DOD), 4,4'-dihydroxybenzophenone, bis(2-hydroxynaphth-1-yl)methane, bis(4-hydroxynaphth-1-yl)methane, 1,5-dihydroxynaphthalene, tris(4-hydroxyphenyl)methane, 1,1,2,2-tetrakis(4-hydroxyphenyl)ethane, bis(4-hydroxyphenyl)ether and bis(4-hydroxyphenyl)sulfone;

condensation products of phenols with formaldehyde, which are obtained under acid conditions, such as phenol novolac resins or cresol novolac resins, also called bisphenol F novolac resins;

aromatic amines, such as aniline, toluidine, 4-aminophenol, 4,4'-methylene di-phenyldiamine, 4,4'-methylene diphenyldi-(N-methyl)amine, 4,4'-[1,4-phenylene-bis(1-methylethylidene)]bisaniline (bisaniline P), and 4,4'-[1,3-phenylene-bis(1-methylethylidene)]bisaniline (bisaniline M).

Other suitable epoxy resins are aliphatic or cycloaliphatic polyepoxy resins, in particular glycidyl ethers of saturated or unsaturated, branched or unbranched, cyclic or open-chain di-, tri- or tetrafunctional $C_2$- to $C_{30}$-alcohols, in particular ethylene glycol, propylene glycol, butylene glycol, hexanediol, octanediol, polypropylene glycols, dimethylol cyclohexane, neopentyl glycol, dibromoneopentyl glycol, castor oil, trimethylol propane, trimethylol ethane, pentaerythrol, sorbitol or glycerol, and alkoxylated glycerol or alkoxylated trimethylol propane;

a hydrogenated bisphenol A, F or A/F liquid resin, or the glycidylation products of hydrogenated bisphenol A, F or A/F;

an N-glycidyl derivative of amides or heterocyclic nitrogen bases, such as triglycidyl cyanurate and triglycidyl isocyanurate, and reaction products of epichlorohydrin and hydantoin; and epoxy resins obtained from the oxidation of olefins, for example particularly vinyl cyclohexene, dicyclopentadiene, cyclohexadiene, cyclododecadiene, cyclododecatriene, isoprene, 1,5-hexadiene, butadiene, polybutadiene or divinyl benzene.

The epoxy resin is preferably a liquid resin based on a bisphenol, in particular a diglycidyl ether of bisphenol A, bisphenol F or bisphenol A/F, which are commercially available from Dow, Huntsman and Hexion, for example. These liquid resins have a low viscosity for epoxy resins and in the cured state have advantageous properties as coatings. They can optionally be present in combination with bisphenol A solid resin or bisphenol F novolac epoxy resin.

The epoxy resin can contain a reactive diluent, in particular a reactive diluent which has at least one epoxy group. Suitable reactive diluents include, for example, the glycidyl ethers of monovalent or polyvalent phenols and aliphatic or cycloaliphatic alcohols, in particular the above-stated polyglycidyl ethers of diols or polyols, and also in particular phenyl glycidyl ether, cresyl glycidyl ether, benzyl glycidyl ether, p-n-butylphenyl glycidyl ether, p-tert-butylphenyl glycidyl ether, nonylphenyl glycidyl ether, allyl glycidyl ether, butyl glycidyl ether, hexyl glycidyl ether, 2-ethylhexyl glycidyl ether, and glycidyl ethers from natural alcohols, such as $C_8$- to $C_{10}$-alkyl glycidyl ether or $C_{12}$- to $C_{14}$-alkyl glycidyl ether. Adding a reactive diluent to the epoxy resin results in a reduction in its viscosity and a reduction in its glass transition temperature and its mechanical values.

The epoxy resin composition optionally contains additional constituents, in particular auxiliary agents and additives commonly used in epoxy resin compositions, for example:

solvents, diluents, film-forming agents or extenders, in particular the above-stated non-incorporable diluents;

reactive diluents, in particular epoxy group-containing reactive diluents, such as those mentioned above, epoxidizied soybean oil or linseed oil, compounds containing acetoacetate groups, in particular acetoacetylated polyols, butyrolactone, carbonates, aldehydes, along with isocyanates and silicones containing reactive groups;

polymers, in particular polyamides, polysulfides, polyvinyl formal (PVF), polyvinyl butyral (PVB), polyurethane (PUR), polymers with carboxyl groups, polyamides, butadiene-acrylonitrile copolymers, styrene-acrylonitrile copolymers, butadiene-styrene copolymers, homopolymers or copolymers of unsaturated monomers, in particular from the group comprising ethylene, propylene, butylene, isobutylene, isoprene, vinyl acetate and alkyl(meth)acrylates, in particular chlorosulfonated polyethylenes and fluorine-containing polymers, sulfonamide-modified melamines and purified montan waxes;

inorganic and organic fillers, for example ground or precipitated calcium carbonates, which are optionally coated with fatty acids, in particular stearates, barite (heavy spar), talcs, quartz dust, quartz sand, micaceous iron ore, dolomite, wollastonite, kaolins, mica (potassium aluminum silicate), powdered molecular sieves, aluminum oxides, aluminum hydroxides, magnesium hydroxide, silicic acids, cements, gypsums, fly ashes, carbon black, graphite, metal powder such as aluminum, copper, iron, zinc, silver or steel, PVC powder or hollow spheres;

fibers, in particular glass fibers, carbon fibers, metal fibers, ceramic fibers or plastic fibers, such as polyamide fibers or polyethylene fibers;

pigments, in particular titanium dioxide and iron oxides;

the aforementioned accelerators;

rheology modifiers, in particular thickeners or antisettling agents;

adhesion promoters, in particular organoalkoxy silanes;

stabilizers against oxidation, heat, light and UV radiation;

flame-retardant substances, in particular aluminum hydroxide (ATH), magnesium dihydroxide (MDH), antimony trioxide, antimony pentoxide, boric acid $(B(OH)_3)$, zinc borate, zink phosphate, melamine borate, melamine cyanurate, ammonium polyphosphate, melamine phosphate, melamine pyrophosphate, polybromated diphenyloxides or diphenylethers, phosphates, in particular diphenylcresyl phosphate, resorcinol-bis(diphenylphosphate), resorcinol-diphosphate oligomer, tetraphenylresorcinol diphosphite, ethylenediamine diphosphate and bisphenol-A-bis(diphenylphosphate), tris(chloroethyl)phosphate, tris(chloropropyl)phosphate and tris(dichloroisopropyl)phosphate, tris[3-bromo-2,2-bis(bromomethyl)propyl]phosphate, tetrabromo-bisphenol-A, bis(2,3-di-bromopropylether) of bisphenol A, bromated epoxy resins, ethylene-bis-(tetrabromophthalimide), ethylene-bis(dibromo-norbornane dicarboximide), 1,2-bis(tribromophenoxy)ethane, tris(2,3-dibromopropyl)isocyanurate, tribromophenol, hexabromocyclododecane, bis(hexachlorocyclopentadieno)cyclooctane and chloroparaffins;

surface-active substances, in particular wetting agents, flow-control agents, deaerating agents and defoaming agents; and biocides, such as algicides, fungicides or fungal growth inhibitors.

The epoxy resin composition preferably contains additional auxiliary agents and additives, in particular wetting agents, flow-control agents, defoaming agents, stabilizers, pigments and catalysts, in particular salicylic acid or 2,4,6-tris(dimethylaminomethyl)phenol.

The epoxy resin composition preferably contains no or only a small concentration of non-incorporable diluents, particularly preferably less than 10 wt %, in particular less than 5 wt %, most preferably less than 2 wt %.

In the epoxy resin composition, the ratio of the number of groups that are reactive to epoxy groups to the number of epoxy groups is preferably between 0.5 and 1.5, in particular between 0.7 and 1.2.

The amine hydrogens present in the epoxy resin composition and any other groups that are reactive to epoxy groups and may be present react with the epoxy groups, opening the rings thereof (addition reaction). As a result of these reactions, the composition polymerizes and ultimately cures. A person skilled in the art knows that primary amino groups are difunctional in relation to epoxy groups, and therefore one primary amino group counts as two groups that are reactive to epoxy groups.

In particular, the epoxy resin composition is a two-component composition consisting of
(i) a resin component containing at least one epoxy resin and
(ii) a curing agent component containing the described curing agent.

The components of the two-component composition are each stored in a separate container. Other constituents of the two-component epoxy resin composition can be present as constituents of the resin component or the curing agent component, with additional constituents that are reactive to epoxy groups preferably being a constituent of the curing agent component. Suitable containers for storing the resin component or curing agent component include, in particular, a drum, a hobbock, a bag, a bucket, a can, a cartridge or a tube. The components can be stored, in other words, they can be kept for a period of several months to a year or even longer before use, without their respective properties being altered to a degree that is relevant to their use. To use the two-component epoxy resin composition, the resin component and the curing agent component are combined with one another shortly before or during application. The mixing ratio of the two components is preferably selected such that the groups of the curing agent component that are reactive to epoxy groups are in a suitable ratio to the epoxy groups of the resin component, as described above. The mixing ratio of resin component to curing agent component in parts by weight is typically within the range of 1:10 to 10:1.

The two components are mixed by means of a suitable method, and can be carried out continuously or batchwise. If mixing takes place prior to application, care must be taken to ensure that too much time does not elapse between mixing of the components and application, since this can lead to problems, for example a delayed or incomplete development of adhesion to the substrate. Mixing is carried out particularly at ambient air temperature, which typically ranges from approximately 5 to 50° C., preferably approximately 10 to 30° C.

Once the two components are mixed, curing begins as a result of a chemical reaction, as described above. Curing takes place particularly at ambient air temperature. It typically takes several days to weeks for full curing under the given conditions. The duration of this period is dependent, for example, on the temperature, the reactivity of the constituents and the stoichiometry thereof, and on the presence of accelerators.

A further subject matter of the invention is therefore also a cured composition obtained from the curing of an epoxy resin composition as described in the present document.

The epoxy resin composition is applied to at least one substrate, with the following being particularly suitable:

glass, glass ceramic, concrete, mortar, bakestone, brick, gypsum and natural stones such as granite or marble;

metals and alloys, such as aluminum, iron, steel and non-ferrous metals, including surface-treated metals and alloys, such as zinc-coated and chrome-coated metals;

leather, textiles, paper, wood, wood materials bonded with resins, for example phenol resins, melamine resins or epoxy resins, resin/textile composite materials and other so-called polymer composites;

plastics, in particular hard and soft PVC, ABS, polycarbonate (PC), polyamide (PA), polyester, PMMA, epoxy resins, PUR, POM, PO, PE, PP, EPM and EPDM, with the plastics being optionally surface-treated with plasma, corona or flame;

fiber-reinforced plastics, such as carbon fiber-reinforced plastics (CFK), glass fiber-reinforced plastics (GFK) and sheet molding compounds (SMC);

coated substrates, such as powder-coated metals or alloys; paints and varnishes.

The substrates can be pretreated as needed prior to application of the epoxy resin composition. Pretreatments of this type comprise, in particular, physical and/or chemical cleaning processes, for example grinding, sandblasting, shot blasting, brushing and/or pressure cleaning, and treating with cleaning agents or solvents, or applying an adhesion promoter, an adhesion promoting solution or a primer.

The described epoxy resin composition is advantageously usable as a fiber composite material (composite), casting compound, caulking compound, adhesive, film, coating, paint, varnish, sealer, basecoat or primer.

It is particularly usable as a casting compound, a caulking compound and an adhesive, for example as electronic casting resin, sealing compound, panel adhesive, sandwich element adhesive, semi-monocoque adhesive, for example for rotor blades of wind turbines, a bridge element adhesive or anchoring adhesive; and also as a film, coating, paint, varnish, sealant, basecoat and primer for construction and industrial applications, and particularly as a floor covering and floor coating for interior spaces such as offices, industrial buildings, gymnasiums or refrigerated spaces, or in exterior applications for balconies, patios, parking decks, bridges or roofs, as a protective coating for concrete, cement, metals, plastics or wood, for example for sealing the surfaces of wood structures, vehicles, loading platforms, tanks, silos, shafts, ducts, pipelines, machinery or steel structures, for example on ships, piers, offshore platforms, sluice gates, hydroelectric power plants, river works, swimming pools, wind turbines, bridges, chimneys, cranes or sheet piling; and also as a primer, an adhesive coating, anti-corrosive primer or for hydrophobing surfaces. Onto the fully or partially cured epoxy resin composition, especially if it is used as a coating, film or paint, an additional coating, an additional covering or an additional paint may be applied, wherein this additional layer can likewise be an epoxy resin composition, but can also be a different material, in particular a polyurethane or polyurea coating.

The described epoxy resin composition can particularly advantageously be used as a coating. A coating is understood as any type of film that is applied to a planar surface, in particular including paints, varnishes, sealants, base coats and primers, as described above. The described epoxy resin composition can be used to particular advantage in low-emission products that have environmental seals of quality, for example according to Emicode (EC1 Plus), AgBB, DIBt, Der Blaue Engel, AFSSET, RTS (M1) and US Green Building Council (LEED).

The epoxy resin composition is advantageously used as a coating in a coating method in which it has a liquid consistency of low viscosity and good flow properties, and can in particular be applied as a self-leveling coating to predominantly flat surfaces, or as a paint. In this application, immediately after the resin is mixed with the curing agent component, the epoxy resin composition preferably has a viscosity, measured at 20° C., of 300 to 2,000 mPa·s, preferably of 300 to 1,500 mPa·s, very preferably of 300 to 1,200 mPa·s. The mixed composition is applied to a substrate within the working time as a thin film having a layer thickness of typically approximately 50 μm to approximately 5 mm, typically at ambient air temperature. The composition is preferably applied by pouring it onto the substrate to be coated and then uniformly distributing it with the aid, for example, of a doctor blade or a toothed trowel. However, it may also be applied using a brush or roller, or by spray application, for example as an anti-corrosion protective coating on steel.

Largely clear, glossy and non-tacky films with high hardness and low brittleness which adhere well to a very wide range of substrates are typically formed during curing.

A film with high hardness and low brittleness preferably has a King hardness (pendulum recoil according to King, measured according to DIN EN ISO 1522) ranging from 100 to 200 s, in particular 120 to 180 s. Higher King hardness typically also has high brittleness, and lower King hardness is too soft for many coating applications.

A further subject matter of the invention is an article containing a cured composition, obtained by curing the described epoxy resin composition. The cured composition is present particularly in the form of a coating.

The described epoxy resin composition is characterized by advantageous properties. It is of low viscosity and cures rapidly even under damp and cold conditions, and largely without blushing, producing non-tacky, clear films of high hardness and low brittleness, even using only small fractions of non-incorporable diluents, or none at all, and especially even using only small fractions of volatile primary diamines, or none at all. Using the described epoxy resin composition, particularly low-emission epoxy resin products can be produced, which comply with the standards for many environmental quality seals, while at the same time satisfying high demands with respect to work safety and properties relating to processing and use. The clever use of volatile primary diamines in the form of the adduct and/or in N,N'-dialkylated form, combined with poorly volatile primary diamines, allows the use of cost-effective primary diamines, in particular MPMD or MXDA, which are known and proven in the epoxy resin industry and which are being tolerated in free form in increasingly lower quantities due to increasingly strict specifications.

Examples

The following is a description of embodiment examples which are intended to illustrate the described invention in greater detail. Of course, the invention is not limited to these described examples.
"ANEW" stands for the amine hydrogen equivalent weight.
"EEW" stands for the epoxy equivalent weight.
"MGC" stands for "Mitsubishi Gas Chemical".
"Sec. diamine" stands for "secondary diamine".

1. Description of Measuring Methods

Viscosity was measured on a Rheotec RC30 cone/plate viscosimeter (cone diameter 50 mm, cone angle 1°, cone vertex to plate distance 0.05 mm, shear rate 10 s$^{-1}$) controlled by a thermostat.

The amine concentration, that is, the total concentration of amino groups in the prepared compounds, was determined by titrimetry (with $0.1_N$ HClO$_4$ in glacial acetic acid, against crystal violet stain) and is indicated in each case in mmol N/g.

2. Commercial Substances Used

Araldite® DY-K: (Huntsman), cresyl glycidyl ether, EEW approx. 182 g/eq
Araldite® DY-P: (Huntsman), p-tert-butylphenyl glycidyl ether, EEW ca. 233 g/eq
Araldite® GY 250: (Huntsman), bisphenol A diglycidyl ether, EEW approx. 187.5 g/eq
Araldite® DY-E: (Huntsman), monoglycidyl ether of a $C_{12}$- to $C_{14}$-alcohol, EEW approx. 290 g/eq
Ancamine® K 54: (Air Products), 2,4,6-tris(dimethylaminomethyl)phenol
Dytek® A: (Invista), 1,5-diamino-2-methylpentane
Dytek® EP: (Invista), 1,3-pentanediamine
Vestamin® TMD: (Evonik), 2,2,4- and 2,4,4-trimethylhexamethylenediamine, AHEW approx. 39.6 g/eq, abbreviated "TMD"
1,3-BAC: (MGC), 1,3-bis(aminomethyl)cyclohexane, AHEW approx. 35.5 g/eq, abbreviated "3BAC"
MXDA: (MGC), 1,3-bis(aminomethyl)benzene, abbreviated "MXDA"
DETA: (Huntsman), diethylenetriamine
Gaskamine® 240: (MGC), styrolized 1,3-bis(aminomethyl)benzene, AHEW approx. 103 g/eq, abbreviated "240"
Jeffamine® RFD—(Huntsman), cycloaliphatic ether group-containing diamine
270: obtained from the propoxylation and subsequent amination of 1,4-dimethylolcyclohexane, average molecular weight approx. 270 g/mol, AHEW approx. 67 g/eq, abbreviated "RFD"
Jeffamine® EDR—(Huntsman), 4,7-dioxa-1,10-decanediamine,
176: AHEW approx. 44 g/eq, abbreviated "EDR"
Jeffamine® D-230: (Huntsman), polyoxypropylenediamine with an average molecular weight of approx. 240 g/mol, AHEW approx. 60 g/eq, abbreviated "D230"
Jeffamine® XTA—(Huntsman), 1,4-bis(aminomethyl)cyclohexane, AHEW
801: approx. 39.5 g/eq, abbreviated "4BAC"
Vestamin® IPD: (Evonik); isophoronediamine, AHEW approx. 42.6 g/eq, abbreviated "IPD"
Amicure® PACM: (Air Products), 4,4'-diaminodicyclohexylmethane, AHEW approx. 52.5 g/eq, abbreviated "PACM"

Baxxodur™ EC (BASF), 3,3'-dimethyl-4,4'-diaminodicyclohexylmethane,
331: AHEW approx. 61 g/eq, abbreviated "EC331"

3. Preparation of Adducts

Adduct A-1:

182.0 g (1 mol) Araldite® DY-K was mixed well with 116.0 g (1 mol) Dytek® A, heated in a sealed container to 60° C. for a period of 2 hours, then cooled to room temperature and placed in storage sealed. A clear, slightly yellowish liquid having a viscosity at 20° C. of 5.8 Pa·s, an amine value of 377 mg KOH/g and a theoretical AHEW of approx. 99.4 g/eq was obtained.

Adduct A-2:

In the same manner as described for adduct A-1, 200.2 g (1.1 mol) Araldite® DY-K was reacted with 116.0 g (1 mol) Dytek® A. A clear, slightly yellowish liquid having a viscosity at 20° C. of 13.1 Pa·s, an amine value of 355 mg KOH/g and a theoretical AHEW of approx. 109.1 g/eq was obtained.

Adduct A-3:

In the same manner as described for adduct A-1, 182.0 g (1 mol) Araldite® DY-K was reacted with 158.3 g (1 mol) Vestamin® TMD. A clear, slightly yellowish liquid having a viscosity at 20° C. of 6.4 Pa·s, an amine value of 332 mg KOH/g and a theoretical AHEW of approx. 113.4 g/eq was obtained.

Adduct A-4:

In the same manner as described for adduct A-1, 182.0 g (1 mol) Araldite® DY-K was reacted with 142.0 g (1 mol) 1,3-BAC. A clear, slightly yellowish liquid having a viscosity at 20° C. of 74.8 Pa·s, an amine value of 347 mg KOH/g and a theoretical AHEW of approx. 108.0 g/eq was obtained.

Adduct A-5:

In the same manner as described for adduct A-1, 182.0 g (1 mol) Araldite® DY-K was reacted with 136.2 g (1 mol) MXDA. A clear, slightly yellowish liquid having a viscosity at 20° C. of 28.1 Pa·s, an amine value of 344 mg KOH/g and a theoretical AHEW of approx. 106.1 g/eq was obtained.

Adduct A-6:

In the same manner as described for adduct A-1, 182.0 g (1 mol) Araldite® DY-K was reacted with 103.1 g (1 mol) DETA. A clear, slightly yellowish liquid having a viscosity at 20° C. of 10.3 Pa·s, an amine value of 578 mg KOH/g and a theoretical AHEW of approx. 71.3 g/eq was obtained.

Adduct A-7:

30.7 g (0.3 mol) Dytek® EP was prepared and heated. Under a nitrogen atmosphere and with vigorous stirring, 18.2 g (1.0 mol) Araldite® DY-K was added slowly at a temperature of 80° C. over a period of 40 minutes, making sure that the temperature of the reaction mixture did not rise above 85° C. The reaction mixture was left to rest for a period of 3 hours at 80° C. The volatile constituents were then removed at 90° C. and 1 mbar using a rotary evaporator. After 5 hours, 94 percent by weight of the surplus amine had been removed. The reaction mixture was cooled, sealed and placed in storage. A clear, slightly yellowish liquid having a viscosity of 3.6 Pa·s, an amine value of 417.5 mg KOH/g and a theoretical AHEW of approx. 94.7 g/eq was obtained.

Adduct A-8:

In the same manner as described for adduct A-7, 34.9 g (0.3 mol) Dytek® A was reacted with 18.2 g (1.0 mol) Araldite® DY-K. After 6 hours at 90° C. and 24 hours at 60° C. in the rotary evaporator, 92 percent by weight of the surplus amine had been removed. The reaction mixture was cooled, sealed and placed in storage. A clear, slightly yellowish liquid having a viscosity of 10.9 Pa·s, an amine value of 356.7 mg KOH/g and a theoretical AHEW of approx. 99.4 g/eq was obtained.

4. Preparation of Secondary Diamines

Sec. diamine S-1: 1,3-bis(2-ethylhexylaminomethyl)benzene

In a round-bottomed flask, 25.6 g (0.20 mol) 2-ethylhexanal and 13.6 g (0.10 mol) MXDA was dissolved under a nitrogen atmosphere in sufficient isopropanol. The solution was stirred for a period of 30 minutes at room temperature, after which it was hydrogenated at a hydrogen pressure of 80 bar, a temperature of 80° C. and a flow rate of 3 ml/min on a continuously operating hydrogenation apparatus with a Pd/C fixed bed catalyst. To monitor the reaction, the solution was inspected using IR spectroscopy to determine whether the imine bands had disappeared at approx. 1665 cm$^{-1}$. The solution was then evaporated in a vacuum at 80° C. The result was a clear, slightly yellowish liquid with a viscosity of 140 mPa·s at 20° C., an amine concentration of 5.50 mmol N/g and a theoretical ANEW of approx. 180.3 g/eq.

Sec. diamine S-2: reaction mixture containing 1,3-bis(2-ethylhexylaminomethyl)benzene and N-2-ethylhexyl-1,3-bis(aminomethyl)benzene In the same manner as described for sec. diamine S-1, 20.5 g (0.16 mol) 2-ethylhexanal was made to react with 13.6 g (0.10 mol) MXDA. A clear, slightly yellowish liquid having a 1,3-bis(2-ethylhexylaminomethyl)benzene concentration of 66.4 wt % and an N-2-ethylhexyl-1,3-bis(aminomethyl)benzene concentration of 30.1 wt % (determined by gas chromatography), a viscosity of 100 mPa·s at 20° C., an amine concentration of 6.39 mmol N/g and a theoretical ANEW of approximately 130.2 g/eq was obtained.

Sec. diamine S-3: 1,3-bis(2-methylpropylaminomethyl)benzene

In the same manner as described for sec. diamine S-1, 14.4 g (0.20 mol) isobutyraldehyde was made to react with 13.6 g (0.10 mol) 1,3-bis(aminomethyl)benzene. A clear, slightly yellowish liquid having a viscosity of 100 mPa·s at 20° C., an amine concentration of 6.37 mmol N/g and a theoretical ANEW of approx. 124.0 g/eq was obtained.

Sec. diamine S-4: N,N'-bis(2-ethylhexyl)-1,5-diamino-2-methylpentane

In the same manner as described for sec. diamine S-1, 25.6 g (0.20 mol) 2-ethylhexanal and 11.6 g (0.10 mol) Dytek® A was reacted. A clear, slightly yellowish liquid having a viscosity of 140 mPa·s at 20° C., an amine concentration of 5.80 mmol N/g and a theoretical ANEW of approx. 170.3 g/eq was obtained.

Sec. diamine S-5: N,N'-bis(2-ethylhexyl)-1,6-hexanediamine

In the same manner as described for sec. diamine S-1, 25.6 g (0.20 mol) 2-ethylhexanal was made to react with 16.6 g (0.10 mol) 1,6-hexanediamine, 70 wt % in water. A clear, slightly yellowish liquid having a viscosity of 130 mPa·s at 20° C., an amine concentration of 6.24 mmol N/g and a theoretical ANEW of approx. 170.3 g/eq was obtained.

Sec. diamine S-6: Reaction mixture containing N,N'-dibenzyl-1,5-diamino-2-methylpentane and N-benzyl-1,5-diamino-2-methylpentane In the same manner as described for sec. diamine S-1, 17.0 g (0.16 mol) benzaldehyde was made to react with 11.6 g (0.10 mol) Dytek® A. A clear, slightly yellowish liquid having a viscosity of approx. 0.1 mPa·s at 20° C., an amine concentration of 9.18 mmol N/g and a theoretical ANEW of approx. 107.2 g/eq was obtained.

5. Preparation of Curing Agents and Epoxy Resin Compositions

For each example, the constituents listed in tables 1 to 6 in the quantities indicated (in parts by weight) of curing agent component were mixed using a centrifugal mixer (SpeedMixer™ DAC 150, FlackTek Inc.), and stored under exclusion of moisture.

The constituents of the resin component listed in tables 1 to 6 were likewise processed and stored.

The two components of each composition were then processed using the centrifugal mixer to form a homogeneous liquid, which was immediately tested as follows: 10 minutes after mixing, the viscosity at 20° C. was determined ("viscosity (10')"). A first film was applied in a layer thickness of 500 μm to a glass plate, and this was stored at 23±1° C. and 50±5% relative humidity (=standard atmosphere, hereinafter abbreviated as "SA"), or cured. On this film, the King hardness (pendulum recoil according to King, measured according to DIN EN ISO 1522) was determined after 2 days ("King hardness (2d SA)") or after 4 days ("King hardness (4d SA)") or after 7 days ("King hardness (7d SA)") or after 4 weeks ("King hardness (SA) (4w)"). After 4 weeks, the aspect of the film was assessed (identified in the table as "Aspect (SA)"). A film that which was clear and had a glossy and non-tacky surface without a structure was assessed as "good". A "structure" in this case is as any type of marking or pattern on the surface.

A second film was applied in a layer thickness of 500 μm to a glass plate, and this was stored immediately after application for a period of 7 days at 8° C. and 80% relative humidity followed by a period of 3 weeks in a SA, or cured. 24 hours after application, a bottle top made of polypropylene was placed on the film, under which a moist sponge was placed. After another 24 hours, the sponge and the lid were removed, and were placed at a new point on the film, from which it was removed again after 24 hours and repositioned, for a total of 4 times. The aspect of this film was then assessed (in the tables referred to as "Aspect (8°/80%)") in the same manner as described for the aspect (SA). In each case, the number of markings that were visible in the film as a result of the moist sponge and/or the lid placed on it was also indicated. If white discoloration or hazing occurred, this is likewise indicated. The King hardness of the films cured in this manner was again determined, in each case after 7 days at 8° C. and 80% relative humidity ("King hardness (7d 8°/80%)") then after 2 more days in SA ("King hardness (+2d SA)") and/or 7 days in SA ("King hardness (+7d SA)") and/or 3 weeks in SA ("King hardness (+3w SA)"). The results are indicated in tables 1 to 6.

Epoxy resin compositions EZ-1 to EZ-31 are examples according to the invention.

Epoxy compositions Ref-1 to Ref-6 are comparative examples.

TABLE 1

Composition and properties of EZ-1 to EZ-7.

| Example | | EZ-1 | EZ-2 | EZ-3 | EZ-4 | EZ-5 | EZ-6 | EZ-7 |
|---|---|---|---|---|---|---|---|---|
| Resin Component: | | | | | | | | |
| Araldite ® GY-250 | | 167.2 | 167.2 | 167.2 | 167.2 | 167.2 | 167.2 | 167.2 |
| Araldite ® DY-E: | | 31.8 | 31.8 | 31.8 | 31.8 | 31.8 | 31.8 | 31.8 |
| Curing Agent Component: | | | | | | | | |
| Adduct A-1 | | 49.7 | 59.6 | 49.7 | 49.7 | 59.6 | 59.6 | 49.7 |
| Primary diamine | | RFD | 3BAC | TMD | IPD | EDR | D230 | PACM |
| | | 22.3 | 9.5 | 13.2 | 14.2 | 13.2 | 18.0 | 17.5 |
| Sec. diamine S-1 | | 30.1 | 23.9 | 30.1 | 30.1 | 18.0 | 18.0 | 30.1 |
| Ancamine ® K 54 | | 6.0 | 5.8 | 5.8 | 5.9 | 5.8 | 5.9 | 5.9 |
| %-fractions | A | 50 | 60 | 50 | 50 | 60 | 60 | 50 |
| NH-Eq[1] | P | 33 | 27 | 33 | 33 | 30 | 30 | 33 |
| | S | 17 | 13 | 17 | 17 | 10 | 10 | 17 |
| Viscosity (10') [Pa·s] | | 0.91 | 1.31 | 0.88 | 0.50 | 1.21 | 1.03 | 1.13 |
| King hardness | (2 d SA) | 120 | 125 | 101 | 129 | 102 | 137 | 150 |
| [s] | (4 d SA) | 141 | 144 | 109 | 155 | 118 | 154 | 169 |
| | (7 d SA) | 151 | 158 | 115 | 168 | 129 | 164 | 157 |
| | (4 w SA) | 170 | 166 | 115 | 190 | 137 | 168 | 192 |
| Aspect (SA) | | good | sl. dull | good | ok | sl. dull | good | good |
| King hardness | (7 d 8°/80%) | 52 | 53 | 60 | 60 | 35 | 46 | 59 |
| [s] | (+2 d SA) | 91 | 115 | 101 | 110 | 93 | 123 | 137 |
| | (+7 d SA) | 126 | 143 | 120 | 139 | 120 | 165 | 135 |
| | (+3 w SA) | 155 | 145 | 133 | 160 | 142 | 168 | 175 |
| Aspect (8°/80%) | | good | dull | good | dull | sl. | sl. | sl. |
| Number of markings | | 1 (f) | 1 (white) | 1 (white) | 1 (white) | structure none | dull 1 (f.) | dull 1 (f.) |

"sl." stands for "slightly";
"f." stands for "faint"
[1] % fractions of the number of amine hydrogens from the adduct ("A"), the primary diamine ("P") and the secondary diamine ("S").

TABLE 2

Composition and properties of EZ-8 to EZ-14.

| Example | | EZ-8 | EZ-9 | EZ-10 | EZ-11 | EZ-12 | EZ-13 | EZ-14 |
|---|---|---|---|---|---|---|---|---|
| Resin Component: | | | | | | | | |
| Araldite ® GY-250 | | 167.2 | 167.2 | 167.2 | 167.2 | 167.2 | 167.2 | 167.2 |
| Araldite ® DY-E: | | 31.8 | 31.8 | 31.8 | 31.8 | 31.8 | 31.8 | 31.8 |
| Curing Agent Component: | | | | | | | | |
| Adduct A-1 | | 49.7 | 49.7 | 49.7 | 49.7 | 49.7 | 49.7 | 49.7 |
| Primary diamine | | EC331 | 4BAC | MXDA | RFD | RFD | RFD | RFD |
| | | 20.3 | 13.2 | 11.3 | 22.3 | 22.3 | 22.3 | 22.3 |
| Sec. diamine | | S-1 | S-1 | S-1 | S-2 | S-3 | S-4 | S-5 |
| | | 30.1 | 30.1 | 30.1 | 21.7 | 20.7 | 28.4 | 28.4 |
| Ancamine ® K 54 | | 6.0 | 5.8 | 5.8 | 5.8 | 5.9 | 6.0 | 6.0 |
| Viscosity (10') [Pa · s] | | 0.77 | 0.57 | 0.45 | 1.19 | 1.26 | 1.01 | 0.98 |
| King hardness | (2 d SA) | 140 | 119 | 113 | 135 | 123 | 105 | 91 |
| [s] | (4 d SA) | 162 | 139 | 127 | 148 | 137 | 123 | 110 |
| | (7 d SA) | 167 | 139 | 130 | 160 | 147 | 140 | 125 |
| | (4 w SA) | 190 | 169 | 144 | 199 | 186 | 142 | 132 |
| Aspect (SA) | | good | good | good | good | hazy | good | good |
| King hardness | (7 d 8°/80%) | 59 | 50 | 69 | 64 | 57 | 38 | 38 |
| [s] | (+2 d SA) | 119 | 109 | 78 | 148 | 126 | 83 | 84 |
| | (+7 d SA) | 148 | 77 | 79 | 171 | 145 | 118 | 109 |
| | (+3 w SA) | 167 | 116 | 90 | 175 | 167 | 130 | 125 |
| Aspect (8°/80%) | | good | hazy | dull | sl. | hazy sl. | sl. | good |
| Number of markings | | 1 (white) | 1 (white) | 2 (f.) | dull 1 (f.) | dull 1 (white) | dull none | 1 (f.) |

"sl." stands for "slightly";
"f." stands for "faint"

TABLE 3

Composition and properties of EZ-15 to EZ-21.

| Example | | EZ-15 | EZ-16 | EZ-17 | EZ-18 | EZ-19 | EZ-20 | EZ-21 |
|---|---|---|---|---|---|---|---|---|
| Resin Component: | | | | | | | | |
| Araldite ® GY-250 | | 167.2 | 167.2 | 167.2 | 167.2 | 167.2 | 167.2 | 167.2 |
| Araldite ® DY-E: | | 31.8 | 31.8 | 31.8 | 31.8 | 31.8 | 31.8 | 31.8 |
| Curing Agent Component: | | | | | | | | |
| Adduct | | A-1 | A-2 | A-2 | A-2 | A-3 | A-4 | A-5 |
| | | 49.7 | 54.6 | 54.6 | 43.6 | 56.7 | 54.0 | 53.1 |
| Primary diamine | | RFD | RFD | RFD | D230 | RFD | RFD | RFD |
| | | 22.3 | 16.8 | 20.1 | 18.0 | 22.3 | 22.3 | 22.3 |
| Sec. diamine | | 240 | S-1 | S-2 | 240 | S-1 | S-1 | S-1 |
| | | 17.2 | 27.0 | 26.0 | 30.9 | 30.1 | 30.1 | 30.1 |
| Ancamine ® K 54 | | 5.8 | 6.0 | 6.0 | 5.8 | 6.2 | 6.1 | 6.1 |
| Viscosity (10') [Pa · s] | | 1.46 | 1.31 | 1.07 | 1.05 | 1.12 | 1.45 | 1.32 |
| King hardness | (2 d SA) | 143 | 102 | 121 | 136 | 109 | 141 | 125 |
| [s] | (4 d SA) | 176 | 139 | 147 | 144 | 144 | 169 | 155 |
| | (7 d SA) | 193 | 150 | 161 | 183 | 165 | 185 | 165 |
| | (4 w SA) | 209 | 179 | 180 | 198 | 176 | 186 | 176 |
| Aspect (SA) | | good | good | good | good | good | sl. markings | good |
| King hardness | (7 d 8°/80%) | 91 | 35 | 63 | 45 | 53 | 64 | 67 |
| [s] | (+2 d SA) | 162 | 101 | 128 | 134 | 119 | 136 | 119 |
| | (+7 d SA) | 193 | 119 | 154 | 172 | 153 | 160 | 137 |
| | (+3 w SA) | 202 | 151 | 167 | 192 | 154 | 164 | 151 |
| Aspect (8°/80%) | | good | good | good | good | sl. dull none | sl. structure | good |
| Number of markings | | 1 (f.) | 1 (f.) | none | none | | 2 (white) | 1 (f.) |

"sl." stands for "slightly";
"f." stands for "faint"

TABLE 4

Composition and properties of EZ-22 to EZ-28.

| Example | | EZ-22 | EZ-23 | EZ-24 | EZ-25 | EZ-26 | EZ-27 | EZ-28 |
|---|---|---|---|---|---|---|---|---|
| Resin Component: | | | | | | | | |
| Araldite ® GY-250 | | 167.2 | 167.2 | 167.2 | 167.2 | 167.2 | 167.2 | 167.2 |
| Araldite ® DY-E: | | 31.8 | 31.8 | 31.8 | 31.8 | 31.8 | 31.8 | 31.8 |
| Curing Agent Component: | | | | | | | | |
| Adduct A-1 | | 39.8 | 49.7 | 49.7 | 59.6 | 59.6 | 59.6 | 74.6 |
| Primary diamine | | RFD | RFD | RFD | RFD | RFD | RFD | RFD |
| | | 28.8 | 20.1 | 26.8 | 18.1 | 20.1 | 15.4 | 10.1 |
| Sec. diamine S-1 | | 30.1 | 36.1 | 18.0 | 23.4 | 18.0 | 30.1 | 18.0 |
| Ancamine ® K 54 | | 6.0 | 6.1 | 5.9 | 6.0 | 5.9 | 6.1 | 6.0 |
| %-fractions | A | 40 | 50 | 50 | 60 | 60 | 60 | 75 |
| NH-Eq[1] | P | 43 | 30 | 40 | 27 | 30 | 23 | 15 |
| | S | 17 | 20 | 10 | 13 | 10 | 17 | 10 |
| Viscosity (10') [Pa · s] | | 0.91 | 1.04 | 1.12 | 1.19 | 1.35 | 1.06 | 1.57 |
| King hardness | (2 d SA) | 123 | 104 | 143 | 130 | 147 | 113 | 141 |
| [s] | (4 d SA) | 128 | 122 | 178 | 161 | 177 | 141 | 159 |
| | (7 d SA) | 160 | 146 | 190 | 170 | 185 | 154 | 184 |
| | (4 w SA) | 186 | 168 | 194 | 173 | 190 | 180 | 185 |
| Aspect (SA) | | good | good | good | good | good | good | good |
| King hardness | (7 d 8°/80%) | 55 | 40 | 62 | 62 | 67 | 59 | 84 |
| [s] | (+2 d SA) | 109 | 106 | 144 | 127 | 147 | 127 | 153 |
| | (+7 d SA) | 135 | 130 | 161 | 155 | 165 | 135 | 172 |
| | (+4 w SA) | 160 | 137 | 164 | 168 | 171 | 147 | 175 |
| Aspect (8°/80%) | | sl. | sl. | sl. | sl. | sl. | sl. | sl. |
| Number of markings | | dull | dull | dull | dull | dull | dull | dull |
| | | 1 (f.) | 1 (f.) | 1 (white) | none | 1 (f.) | 1 (f.) | 1 (f.) |

"sl." stands for "slightly";
"f." stands for "faint"
[1] % fractions of the number of amine hydrogens from the adduct ("A"), the primary diamine ("P") and the secondary diamine ("S").

TABLE 5

Composition and properties of Ref-1 to Ref-6.

| Example | | Ref-1 | Ref-2 | Ref-3 | Ref-4 | Ref-5 | Ref-6 |
|---|---|---|---|---|---|---|---|
| Resin Component: | | | | | | | |
| Araldite ® GY-250 | | 167.2 | 167.2 | 167.2 | 167.2 | 167.2 | 167.2 |
| Araldite ® DY-E: | | 31.8 | 31.8 | 31.8 | 31.8 | 31.8 | 31.8 |
| Curing Agent Component: | | | | | | | |
| Adduct | | A-1 | A-1 | A-1 | A-1 | A-1 | A-6 |
| | | 59.6 | 59.6 | 59.6 | 74.6 | 79.5 | 35.6 |
| Primary diamine | | RFD | TMD | — | — | — | RFD |
| | | 26.8 | 13.2 | | | | 22.3 |
| Sec. diamine | | — | — | S-1 | S-1 | S-1 | S-1 |
| | | | | 72.1 | 45.1 | 36.1 | 30.1 |
| Ancamine ® K 54 | | 5.7 | 5.54 | 6.61 | 6.4 | 6.3 | 5.7 |
| Ratio NH-eq[1] | A | 60 | 60 | 60 | 75 | 80 | 50 |
| | P | 40 | 40 | 0 | 0 | 0 | 33 |
| | S | 0 | 0 | 40 | 25 | 20 | 17 |
| Viscosity (10') [Pa · s] | | 1.74 | 1.61 | 0.73 | 1.11 | 1.20 | 0.96 |
| King hardness | (2 d SA) | 160 | 179 | 46 | 77 | 91 | 111 |
| [s] | (4 d SA) | 181 | 200 | 64 | 88 | 124 | 132 |
| | (7 d SA) | 207 | 205 | 70 | 88 | 125 | 149 |
| | (4 w SA) | 211 | 213 | 70 | 106 | 125 | 152 |
| Aspect (SA) | | good | good | sl. hazy | good | good | hazy, structure |
| King hardness | (7 d 8°/80%) | 113 | 123 | 18 | 39 | 31 | 39 |
| [s] | (+2 d SA) | 178 | 166 | 32 | 75 | 78 | 97 |
| | (+7 d SA) | 192 | 196 | 40 | 97 | 85 | 123 |
| | (+4 w SA) | 216 | 200 | 49 | 105 | 102 | 144 |
| Aspect (8°/80%) | | good | sl. hazy | tacky | good | sl. dull | hazy, structure |
| Number of markings | | 1 (f.) | 1 (f.) | none | none | 1 (f.) | 2 (white) |

"sl." stands for "slightly";
"f." stands for "faint"
[1] % fractions of the number of amine hydrogens from the adduct ("A"), the primary diamine ("P") and the secondary diamine ("S").

TABLE 6

Composition and properties of EZ-29 to EZ-31.

| | | Example | | |
|---|---|---|---|---|
| | | EZ-29 | EZ-30 | EZ-31 |
| Resin Component: | | | | |
| Araldite ® GY-250 | | 167.2 | 167.2 | 167.2 |
| Araldite ® DY-E: | | 31.8 | 31.8 | 31.8 |
| Curing Agent Component: | | | | |
| Adduct | | A-7 | A-8 | A-2 |
| | | 47.4 | 49.7 | 54.6 |
| Primary diamine | | RFD | RFD | RFD |
| | | 22.3 | 22.3 | 20.1 |
| Sec. diamine | | S-1 | S-1 | S-6 |
| | | 30.1 | 30.1 | 21.4 |
| Ancamine ® K 54 | | 5.9 | 6.0 | 5.5 |
| Viscosity (10') [Pa · s] | | 0.75 | 1.15 | 1.29 |
| King hardness | (2 d SA) | 84 | 105 | 178 |
| [s] | (4 d SA) | 129 | 133 | 179 |
| | (7 d SA) | 154 | 153 | 181 |
| | (4 w SA) | 176 | 179 | 206 |
| Aspect (SA) | | good | good | good |
| King hardness | (7 d 8°/80%) | 29 | 35 | 71 |
| [s] | (+2 d SA) | 88 | 90 | 167 |
| | (+7 d SA) | 129 | 115 | 190 |
| | (+4 w SA) | 161 | 136 | 197 |
| Aspect (8°/80%) | | good none | good 1 (f.) | good none |
| Number of markings | | | | |

The invention claimed is:

1. A curing agent, suitable for curing epoxy resins, comprising:
   at least one adduct of at least one primary diamine P1 and at least one aromatic monoepoxide, wherein the adduct is a reaction product of the at least one primary diamine P1 with the at least one aromatic monoepoxide in a ratio of moles of the at least one primary diamine P1 to moles of the at least one aromatic monoepoxide ranging from 1/1 to 1/1.5;
   at least one primary diamine P2; and
   at least one secondary diamine, which is 1,3-bis(2-ethylhexylaminomethyl)benzene or 1,3-bis(2-phenylethylaminomethyl)benzene.

2. The curing agent according to claim 1, wherein the monoepoxide is a cresyl glycidyl ether.

3. The curing agent according to claim 1, wherein the primary diamine P1 is selected from the group consisting of 1,6-hexanediamine, 1,5-diamino-2-methylpentane, 2,2,4- and 2,4,4-trimethylhexamethylenediamine, isophoronediamine, 1,3-bis(aminomethyl)cyclohexane, 1,4-bis(aminomethyl)cyclohexane, 2- and 4-methyl-1,3-diaminocyclohexane and mixtures thereof, and 1,3-bis(aminomethyl)benzene.

4. The curing agent according to claim 1, wherein the adduct is a reaction product of 1,5-diamino-2-methylpentane with a cresyl glycidyl ether in a ratio of moles of the 1,5-diamino-2-methylpentane to moles of the cresyl glycidyl ether ranging from 1/1 to 1/1.2.

5. The curing agent according to claim 1, wherein the primary diamine P2 has a molecular weight ranging from 140 to 300 g/mol, and is selected from the group consisting of isophoronediamine, 2,2,4- and 2,4,4-trimethylhexamethylenediamine, 1,3-bis(aminomethyl)cyclohexane, 1,4-bis(aminomethyl)cyclohexane, bis(4-aminocyclohexyl)methane, bis(4-amino-3-methylcyclohexyl)methane, 4,7-dioxadecane-1,10-diamine, polyoxypropylenediamines and cycloaliphatic ether group-containing diamines from the propoxylation and subsequent amination of 1,4-dimethylolcyclohexane.

6. The curing agent according to claim 5, wherein the primary diamine P2 is a polyoxypropylenediamine or a cycloaliphatic ether group-containing diamine from the propoxylation and subsequent amination of 1,4-dimethylolcyclohexane.

7. The curing agent according to claim 1, wherein the ratios of the at least one adduct, the at least one primary diamine P2 and the at least one secondary diamine are such that, of the total number of amine hydrogens thereof that are reactive to epoxy groups,
   15 to 75% are from the at least one adduct,
   15 to 60% are from the at least one primary diamine P2, and
   10 to 40% are from the at least one secondary diamine.

8. An epoxy resin composition containing at least one epoxy resin and at least one curing agent according to claim 1.

9. The epoxy resin composition according to claim 8, being a two-component composition, consisting of:
   (i) a resin component containing at least one epoxy resin and
   (ii) a curing agent component containing the curing agent.

10. A cured composition obtained by curing a composition according to claim 8.

11. A curing agent, suitable for curing epoxy resins, comprising:
   at least one adduct of at least one primary diamine P1 and at least one aromatic monoepoxide;
   at least one primary diamine P2; and
   at least one secondary diamine, which is 1,3-bis(2-ethylhexylaminomethyl)benzene or 1,3-bis(2-phenylethylaminomethyl)benzene.

12. The curing agent according to claim 11, wherein the monoepoxide is a cresyl glycidyl ether.

13. The curing agent according to claim 12, wherein the primary diamine P1 is selected from the group consisting of 1,6-hexanediamine, 1,5-diamino-2-methylpentane, 2,2,4- and 2,4,4-trimethylhexamethylenediamine, isophoronediamine, 1,3-bis(aminomethyl)cyclohexane, 1,4-bis(aminomethyl)cyclohexane, 2- and 4-methyl-1,3-diaminocyclohexane and mixtures thereof, and 1,3-bis(aminomethyl)benzene.

14. The curing agent according to claim 13, wherein the adduct is a reaction product of 1,5-diamino-2-methylpentane with a cresyl glycidyl ether in a ratio of moles of the 1,5-diamino-2-methylpentane to moles of the cresyl glycidyl ether ranging from 1/0.9 to 1/1.2.

* * * * *